United States Patent
Reynolds

(10) Patent No.: US 6,278,081 B1
(45) Date of Patent: *Aug. 21, 2001

(54) METHOD AND APPARATUS FOR PRODUCING WELDING POWER

(75) Inventor: Jon O. Reynolds, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/488,325

(22) Filed: Jan. 20, 2000

Related U.S. Application Data

(63) Continuation of application No. 08/872,845, filed on Jun. 11, 1997, now Pat. No. 6,114,655.

(51) Int. Cl.[7] .................................................. B23K 9/10
(52) U.S. Cl. ................ 219/130.31; 219/130.33
(58) Field of Search .................... 219/130.33, 130.1, 219/130.31, 130.32, 137 PS; 363/148, 149, 151

(56) References Cited

U.S. PATENT DOCUMENTS

| | | | |
|---|---|---|---|
| 2,431,083 | * 11/1947 | Sciaky | .................................. 363/149 |
| 2,634,396 | * 4/1953 | Solomon | .................................. 363/149 |
| 3,558,845 | 1/1971 | Norcross . | |
| 3,684,855 | 8/1972 | Wepfer . | |
| 3,912,980 | * 10/1975 | Crump et al. | .................... 219/130.33 |
| 4,038,515 | 7/1977 | Risberg . | |
| 4,166,941 | 9/1979 | Cecil . | |
| 4,322,602 | 3/1982 | Grist . | |
| 4,435,632 | 3/1984 | Risberg . | |
| 4,508,954 | 4/1985 | Kroll . | |
| 4,517,439 | * 5/1985 | Colley | .............................. 219/130.33 |
| 4,521,664 | 6/1985 | Miller . | |
| 5,093,611 | 3/1992 | Nakamura et al. . | |
| 5,315,089 | 5/1994 | Hughes et al. . | |
| 5,340,963 | * 8/1994 | Bodewigs | ........................... 219/130.1 |
| 5,343,016 | 8/1994 | Davis et al. . | |
| 5,388,031 | * 2/1995 | Satoh | .................................. 219/130.1 |
| 5,406,052 | 4/1995 | Mizano et al. . | |
| 5,416,299 | 5/1995 | Tabata et al. . | |
| 5,473,139 | 12/1995 | Matsui et al. . | |
| 5,525,778 | 6/1996 | Matsui et al. . | |
| 6,114,655 | * 9/2000 | Reynolds | ........................ 219/130.33 |

FOREIGN PATENT DOCUMENTS

| | | | |
|---|---|---|---|
| 2039166 | * 7/1980 | (GB) | ................................ 219/130.1 |
| 2039167 | * 7/1980 | (GB) | ................................ 219/130.1 |
| 2039168 | * 7/1980 | (GB) | ................................ 219/130.1 |

* cited by examiner

Primary Examiner—Clifford C. Shaw
(74) Attorney, Agent, or Firm—George R. Corrigan

(57) ABSTRACT

A method and apparatus for providing submerged arc welding power is disclosed. The power supply is AC/DC, and may be controlled in either a CV or a CC mode. The power supply includes a cycloconverter that provides a single phase output and receives a three phase input. A controller includes a PI current regulator for operation in the CC mode. The controller also includes a PI voltage regulator. When the CV mode is selected, the voltage and current regulators are cascaded such that the output of the voltage regulator is the set point input to the current regulator.

2 Claims, 6 Drawing Sheets

AC MODE

DC MODE

METHOD AND APPARATUS FOR PRODUCING WELDING POWER

This is a continuation of application Ser. No. 08/872,845 filed on Jun. 11, 1997 now U.S Pat. No. 6,114,655.

FIELD OF THE INVENTION

The present invention relates generally to the art of power supplies for electric arc welding and, more particularly, to power supplies for electric arc welding that provide a CC/CV output that may be either AC or DC, and that are particularly well adapted for submerged arc welding.

BACKGROUND OF THE INVENTION

Submerged arc welding (also called SAW or sub arc) is a type of arc welding where the arc is not visible. Sub arc welding produces coalescence of metals by heating them with an arc between a bare metal electrode and the work piece. The arc and molten metal are submerged in a blanket of granular fusible flux on the work piece. Filler metal is provided by the electrode (or from a supplemental source such as a welding rod or metal granules). The arc is covered by the flux.

Many sub arc applications are automatic welding applications where either the work piece is moved under the weld head or the weld head is moved over the stationary work piece. Such automatic systems include wire feeders and are well known in the art. Wire feeders used in sub arc welding may be either constant speed or variable speed. Constant speed wire feeders are typically used with CV power supplies, and variable speed wire feeders may be used with CC power supplies. Each type of wire feeder has advantages and disadvantages. Preferably, a welding power supply should be useable with a constant speed wire feeder, or useable with either type of wire feeder.

Early automatic sub arc welding applications provided a DC output and used power sources with drooping V-A characteristics and voltage following wire electrode feeders. Subsequently, constant voltage (CV) DC sources were introduced to the process and linked to constant speed wire electrode feeders. However, magnetic fields generated by the DC arc current and surrounding the arc and the field associated with the ground currents react with each other in an unpredictable manner, causing the arc to move as if the arc were being "blown" to one side. This is referred to as arc blow. This effect is most objectionable in deep grove welds where erratic movement of the arc disturbs proper formation and placement of the weld puddle. Arc blow becomes a more severe problem as the amperage increases, because magnetic fields correspondingly increase.

Arc blow is less of a problem when using an AC power supply (because there is not a DC arc current). However, a sinusoidal output does not always perform well in sub arc welding processes because the sinusoidal wave exhibits a slow zero crossover which may result in arc rectification.

Square wave welding power sources attempt to use the advantages of sinusoidal AC welding, but with a rapid zero crossing to avoid arc rectification. One known square wave welding power supply is described in U.S. Pat. No. 4,038, 515 issued to Risberg. This power supply provides for a square wave AC welding output. The Risberg design provides a constant current (CC) output and thus cannot be used with a constant speed wire feeder. The output of this power supply is at a frequency equal to the input frequency.

Another prior art sub arc welding power supply is described in U.S. Pat. No. 4,322,602 which was issued to Grist, and was owned by the assignee of the present invention. Grist describes an AC constant potential (CV) power source which may be used for sub arc welding. The output of Grist is an AC/CV output having a frequency equal to the input frequency, and having a fast zero crossing. This power supply is used with a constant speed wire feeder.

A TIG (Tungsten inert gas) welding power supply is described in U.S. Pat. No. 5,340,963, which is also owned by the assignee of the present invention, and is hereby incorporated by reference. U.S. Pat. No. 5,340,963 shows an AC power source for welding which receives a three phase input and provides a single phase AC output, having relatively fast zero crossings, at a frequency 1.5 times the input frequency. This is a type of step-up cycloconverter. However, this prior art does not teach a CV mode of operation, nor a CC controller. This prior art can be operated in a DC mode, but only operates on half of the sinusoidal input (thus, the SCRs and secondary windings must be able to handle twice the current, relative to the current capacity needed if the entire input were used). This can be costly and add weight and size to the machine.

A "step-up cycloconverter", as used herein, is a cycloconverter having an output frequency greater than the input frequency. It receives an AC input at a given frequency and provides an AC output at a higher frequency. This conversion is obtained by phase control or without using switches that are forced off, such as force commutated SCRs, IGBTs or FETs. Thus, a rectifier followed by an inverter or buck/boost converter is not a cycloconverter. The applicants have learned that sub arc welding performed at a frequency greater than the input line frequency (50 or 60 Hz) will provide a better weld. Power sources that provide an output at greater that than 60 Hz are known and are generally inverters or other converters. However inverter based converters require the use of expensive switches that may be turned off, such as IGBT's. This is particularly true in applications such as sub arc welding where the current desired may exceed 1000 amps. Accordingly, inverter based power supplies for use in sub arc welding may be expensive and not practical.

Additionally, it is desirable to provide flexibility in a welding power supply so that it may be used for a variety of applications. For example, it is desirable to provide a welding power supply that provides an AC or DC output. Also, it is desirable to provide a welding power supply that provides either a CV or a constant current (CC) output, that may be used with a constant or variable speed wire feeder. Inverter based welding power supplies may be AC/DC and CC/CV, but as described above, they may be expensive, and not appropriate for sub arc applications.

Accordingly, it is desirable to provide a welding power supply that is suitable for sub arc welding that maybe operated either a CC, or a CV mode. Also, such a power supply preferably be operable to provide an output having a frequency greater than the input line frequency, when in the AC mode, but not require the use of IGBTs or other switches that may be turned off.

SUMMARY OF THE PRESENT INVENTION

According to a first aspect of the invention a submerged arc welding power supply includes a step-up cycloconverter that has a control input. A controller is coupled to the control input.

The controller has a feedback input in one embodiment. The controller receives a signal indicative of an output parameter on the feedback input, amd controls the output of the cycloconverter in response to the feedback input. Other alternatives include the output parameter being output voltage or current.

The controller includes at least two feedback inputs in another alternative. Signals indicative of the output voltage and output current are received on the feedback inputs. The controller controls the output of the cycloconverter in response to a user selectable one of output current and output voltage.

The controller includes a current regulator and a voltage regulator in one embodiment. If the users selects a CV mode of operation then the voltage and current regulators are cascaded such that the cycloconverter is controlled in response to the output voltage.

The output is selectable between AC and DC in one embodiment.

Another aspect of the invention is an arc welding power supply that includes a step-up cycloconverter. A feedback circuit provides a signal indicative of the output voltage. A controller is coupled to the cycloconverter the feedback circuit. The controller controls the output of the cycloconverter in response to the output voltage to provide a constant voltage output.

A current feedback circuit is also coupled to the controller in an alternative embodiment. The controller controls the output of the cycloconverter in response to a user selectable one of output current and output voltage.

The controller includes voltage and current regulators in one embodiment, If the user chooses to operate in a CV mode then the voltage and current regulators are cascaded such that the cycloconverter is controlled in response to the output voltage.

Yet another aspect of the invention is a submerged arc welding power supply that has a three phase input at an input frequency. A converter receives the input and provides a single phase output having an output frequency that is greater then the input frequency.

The output frequency is 1.5 times the input frequency in one embodiment.

Another embodiment provides for the controller to have a feedback input that receives a signal indicative of an output parameter. The controller controls the output of the converter in response to the parameter.

The controller includes a PI current regulator and the output parameter is output current in one embodiment. The controller includes a PI voltage regulator and the output parameter is output voltage in another embodiment.

The user can select between a CC mode and a CV mode in another embodiment. If the user selects CV mode then the voltage and current regulators are cascaded.

Another aspect of the invention is a method of producing power for submerged arc welding by providing input power to a cycloconverter. The frequency of the power is stepped up using the cycloconverter. The output of the cycloconverter is controlled in response to at least one output parameter.

The cycloconverter is controlled in response to output voltage (CV operation) in one embodiment, and in response to output current (CC operation) in another embodiment. The user may select one of CV or CC operation in another embodiment.

One alternative provides for controlling the cycloconverter by producing a PI voltage error signal and providing the voltage error signal as a set point to a PI current regulator. A PI current error signal is provided and the cycloconverter is controlled in response to the current error output.

Another aspect of the invention is producing arc welding power by cycloconverting a three phase input. An output voltage feedback signal is produced and provided to a controller. The output of the cycloconverter is controlled in response to the output voltage to provide a constant voltage output.

The method includes producing a PI voltage error signal and providing the error signal as a set point to a PI current regulator in an alternative embodiment. A PI current error is produced, and the cycloconverter is controlled in response to the current error output.

Another aspect of the invention is a method of producing submerged arc welding power comprising by receiving a three phase input power at an input frequency and converting the input power to single phase output power having an output frequency that is greater then the input frequency.

The output frequency is 1.5 times the input frequency in one embodiment.

Other principal features and advantages of the invention will become apparent to those skilled in the art upon review of the following drawings, the detailed description and the appended claims.

Figure 1:
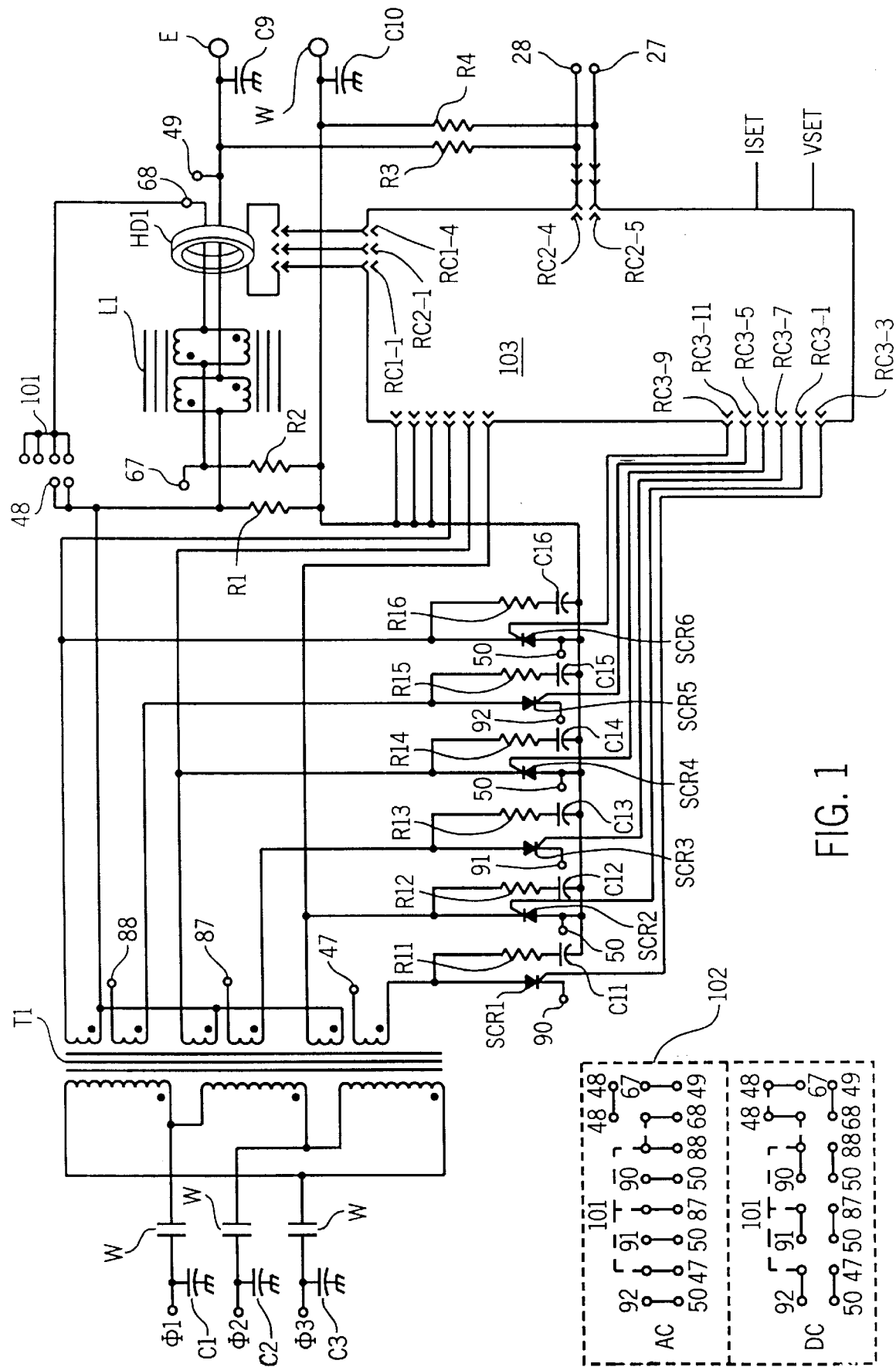
FIG. 1 is a circuit diagram of the power supply of the preferred embodiment, with jumpers showing the connections for either an AC or DC mode.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular power circuit and controller, it should be understood at the outset that the invention may include the addition of other components, removal of components, or the substitution for components. The preferred example, including component values, is not limiting, rather it as exemplary. One skilled in the art should be able to use other components and component values to implement this invention.

A circuit diagram of a AC/DC CC/CV welding power supply configured in accordance with the present invention is shown in FIG. 1. This welding power supply is a submerged arc welding power supply and should be capable of operating in a CV mode. A three phase sinusoidal input is received on a plurality of inputs Φ1, Φ2, and Φ3. A plurality of capacitors C1, C2, and C3 are provided between the inputs and ground to act as high frequency filters. A of contactor having a plurality of contacts W is used to connect the input power to a transformer T1.

The primary transformer T1 is connected in a delta connection, although a wye connection could be used. A delta connection is used in the preferred embodiment because it is designed using wires with a lesser current carrying capacity, but with greater number of turns.

The secondaries of transformer T1 are split, center tapped secondaries. "Split, center tapped secondary," as used herein, is a center-tapped secondary, wherein other circuitry (SCRs e.g.) may be disposed between each set of windings and the center tap. The turns ratio in the preferred embodiment is about 6.9:1 so that 460 volts on Φ1, Φ2, and Φ3 produces about 70 volts open circuit.

The power supply of FIG. 1 may be used to provide either an AC or DC (AC/DC) output. The user selects between an AC and DC output by appropriately connecting a plurality of jumpers. A box 102 shows the position of the jumpers for the AC and DC modes of operation.

A plurality of SCR's, SCR1–SCR6, are connected to the secondary windings. Each SCR is provided with a capacitor (C11–C16) and a resistor (R11–R16) to act as a snubber. The configuration of SCRs 1–6 depends upon the mode (AC or DC) of operation. A controller 103 provides the gating signals to SCR's 1–6 so that they conduct in a manner such as that described in the AC mode of U.S. Pat. No. 5,340,963.

Figure 2:
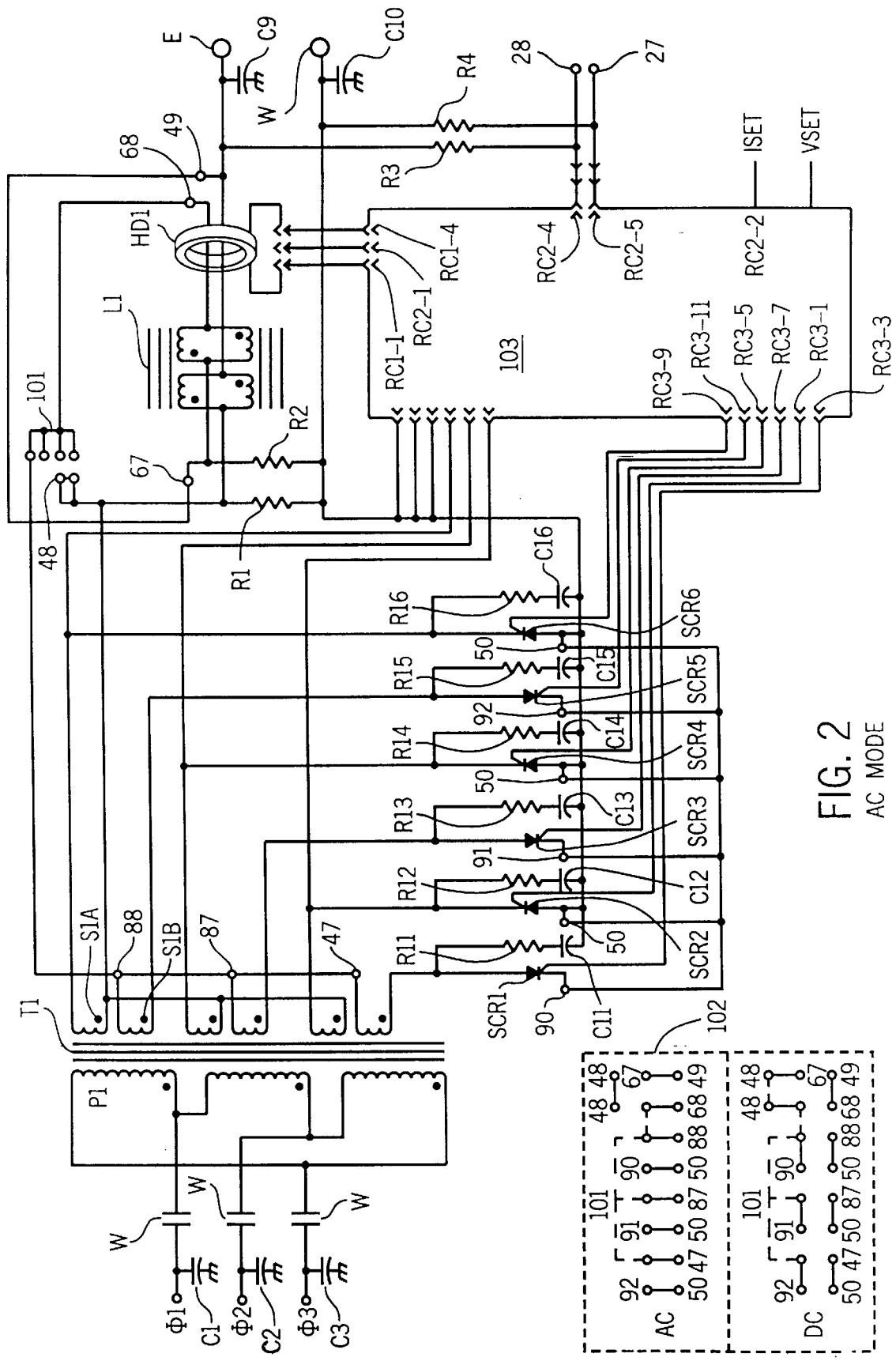
FIG. 2 is a circuit diagram of the power supply of the preferred embodiment configured in the AC mode.

An inductor L1 (400 microhenry each winding), which is a center tap inductor, helps provide a smooth output and assists in rapid zero crossing when the power supply is operated in the AC mode. L1 is configured so that current will flow through the inductor in the same flux creating direction regardless of the direction of current in the primary (and associated secondary) winding. Each leg of inductor L1 is comprised of two magnetically parallel windings made of aluminum and mounted on opposite legs of a U core to help carry the high current load in the preferred embodiment. Inductor L1 will be connected in one of two ways (as shown in FIGS. 2 and 3), depending upon the mode of operation selected (AC or DC).

A pair of resistors R1 and R2 (20 ohms) are provided to help SCRs 1–6 latch ON under no load condition. A hall device HD1 is provided to sense the current output and provide it to controller 103 on an input RC2-1. Inputs RC1-1 and RC1-4 provide power to hall device HD1.

A pair of capacitors C9 and C10 are provided to an output electrode E and a workpiece W. Capacitors C9 and C10 have a capacitance of 0.1 $\mu F$ and are provided to act as high frequency filters.

A pair of resistors R3 and R4 (200 ohms) are used to sense the output voltage provided to electrode E and work W, and are provided to controller 103 on inputs RC2-4 and RC2-5. Controller 103 includes a current regulator for operation in the constant current mode which uses the current feedback from hall device HD1. In the preferred embodiment (described in more detail below with reference to FIG. 4), a typical analog PI current regulator is provided. Controller 103 also includes a voltage regulator for operation in the CV mode which uses the voltage feedback from resistors R3 and R4. In the preferred embodiment (described in more detail below with reference to FIG. 5), a typical analog PI voltage regulator is provided.

The output of the power circuit may be controlled by controlling the phase angle at which the SCR's are fired. To increase the output of the power circuit the SCR's are phased forward so that they fire earlier in each cycle. Conversely, to decrease the output, the SCR's are phased back so that they fire later. The nominal conduction time for each SCR is 120 degrees (of the input cycle) so that the output frequency is 1.5 times the input frequency.

Controller 103 receives an input command ISET indicative of a user selected output current. ISET is obtained from a front panel potentiometer (or a remote or other input device) of the welding power supply when it is operated in the CC mode. Controller 103 compares ISET to the sensed current and controls the firing angle of SCRs 1–6 accordingly. A variable speed wire feeder is used in the CC mode in the preferred embodiment.

Controller 103 also includes an input VSET indicative of a user selected output voltage for operation in the CV mode. VSET allows the user to select a Constance voltage output. The PI voltage regulator of controller 103 has an output dependent upon the difference between VSET and the output voltage received via resistors R3 and R4. The output of the voltage regulator is provided as the set point input, ISET, (instead of the user selected output current) to the current regulator. The current and voltage regulators are thus cascaded such that a CV output is obtained. A constant speed wire feeder is used in the CV mode in the preferred embodiment.

The power supply of FIG. 1, having the jumpers connected in the AC mode, is shown in FIG. 2. A plurality of terminals 47, 87 and 88, are connected to the undotted end of one leg of each secondary on transformer T1. These legs of each secondary are connected to, on the dotted end, SCRs 1, 3 and 5. SCRs 1, 3 and 5 are configured to allow current flow (when on) from the dotted end of the secondary to the SCR. SCRs 1, 3 and 5 are also each connected to a terminal 50 (through a plurality of terminals 90, 91 and 92). Terminal 50 is also connected to workpiece W. The undotted end of these secondaries is connected to an end of inductor Li. The center tap of inductor L1 is connected to the electrode.

The other halves of the secondaries have their dotted ends connected together and also connected to the other end of inductor L1. The undotted ends of these secondaries are connected to SCRs 2, 4 and 6, which allow current to flow into the undotted ends of the secondaries (when on). SCRs 2, 4 and 6 are also connected to the workpiece.

The current paths will now be described with respect to secondaries S1A and S1B, which are associated with primary P1. When SCR6 is on, current flows through SCR6 to the undotted end of secondary S1A, then from the dotted end of secondary S1A through inductor L1 to electrode E, through the arc to workpiece W, and back to SCR6. Similar current paths exist with SCRs 2 and 4. When SCR5 is on, current flows from the dotted end of secondary S1B through SCR5, to workpiece W, through the arc to electrode E, through L1, and back to the undotted side of the secondary. Similar current paths exist with SCRs 1 and 3.

Figure 2A:
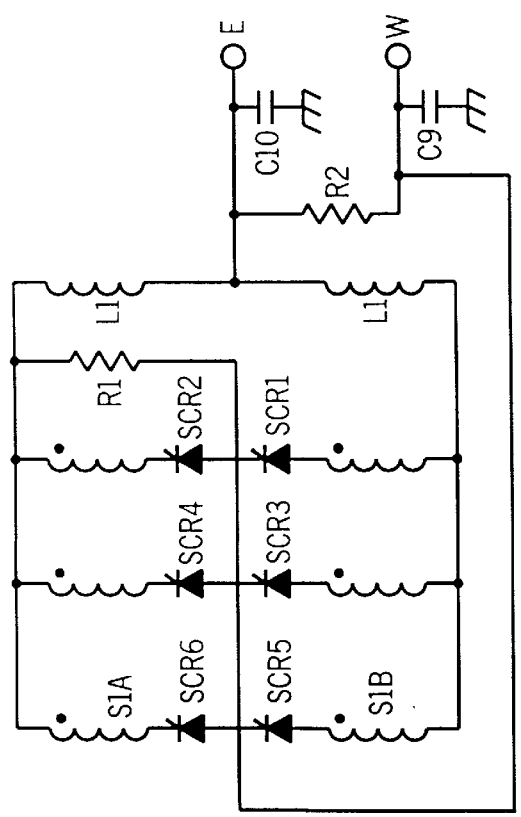
FIG. 2A is a circuit diagram of the power supply of the preferred embodiment configured in the AC mode, wherein most of the non-power components are not shown.

FIG. 2A is a simplified circuit diagram showing the power supply of FIGS. 1 and 2 connected in the AC mode. However, FIG. 2A primarily shows the secondary side power components on the configured in the AC mode, and omits snubbers etc., and the jumpers relating to the DC mode.

FIG. 2A shows that, in the AC mode, the power circuit of the present invention, is configured much like the power circuit of U.S. Pat. No. 5,340,963. Specifically, when the SCR's are fired in a sequence of SCR6, SCR3, SCR2 SCR5, SCR4, SCR1, and each SCR is conducts for at most 120 degrees before the zero crossing, an output signal having a frequency of 1.5 times the input line frequency is created. However, according to the present invention, the power circuit may be operated in a CC or CV mode. Thus, it may be seen that a step up cycloconverter is provided which operates in a CV or a CC mode.

Because the output is provided through center tap conductor L1 so that the current is always flowing in the same flux creating direction in L1, regardless of the direction of the output current flow, inductor L1 smooths the welding current and assists in a rapid zero crossing.

The power source as configured in a DC mode is shown in FIG. 3. SCR's 1, 3, and 5 are connected to bus bar 101 while SCR's 2, 4, and 6 are connected to the work piece in the DC mode. The SCR's are fired in the same sequence as that for the AC mode. However, in this configuration the output will be a DC output. Inductor L1 is used to provide a smoother welding output.

Current flows from the dotted side of secondary S1A through inductor L1, through the arc, through SCR6, and back to secondary SiA. Similar current paths exist through SCRs 2 and 4. Another current path is from the dotted end of secondary S1B, through SCR5, through inductor L1 (in the same flux-creating direction sa the other current path), through the arc and back to secondary S1B. Similar current paths exist through SCRs 1 and 3.

Figure 3A:
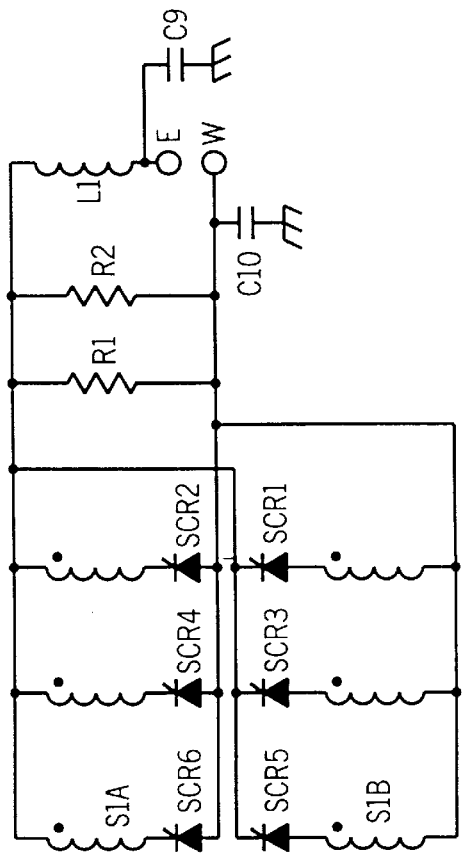
FIG. 3A is a circuit diagram of the power supply of the preferred embodiment configured in the DC mode, wherein most of the non-power components are not shown.
Figure 3:
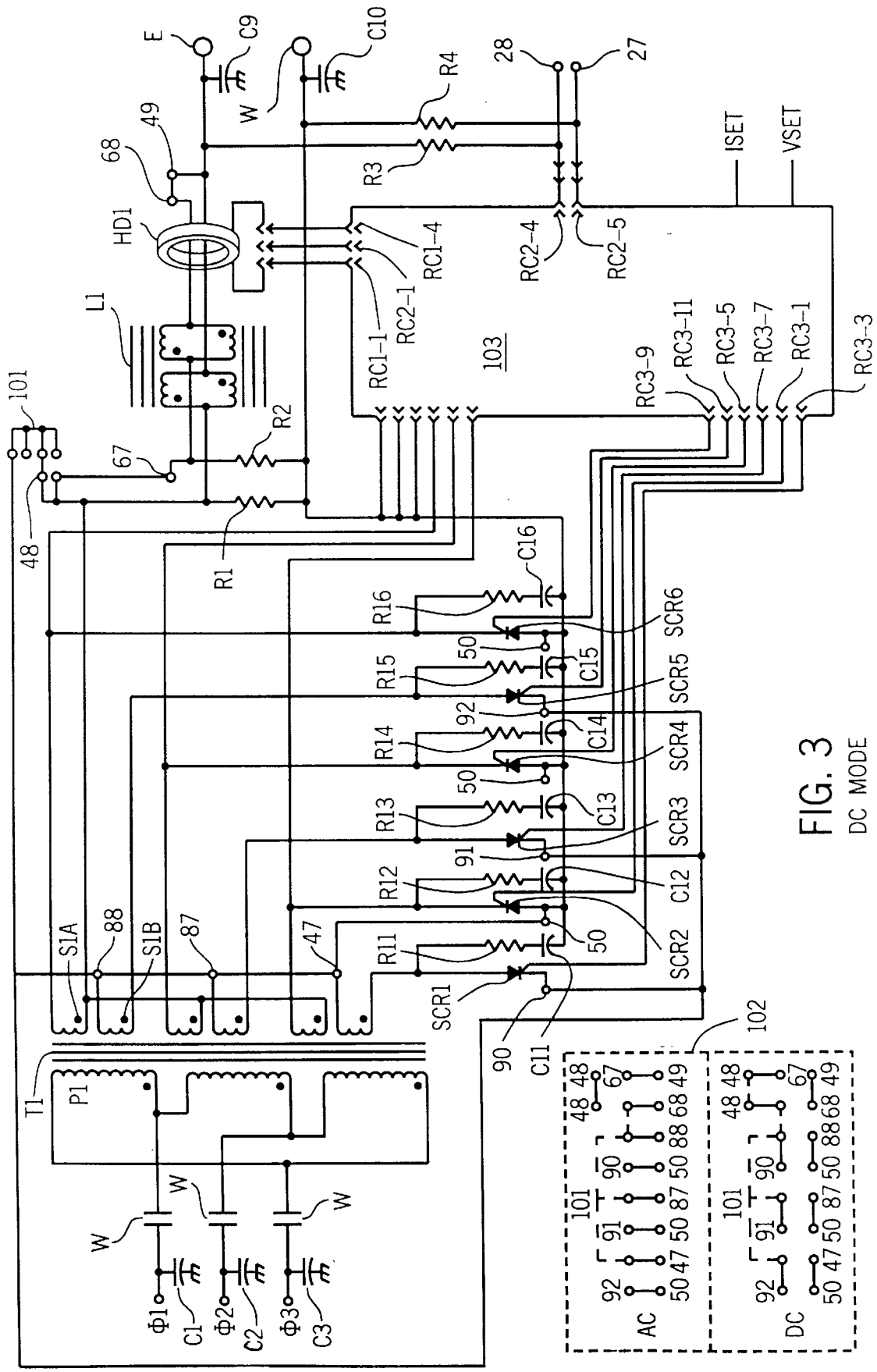
FIG. 3 is a circuit diagram of the power supply of the preferred embodiment configured in the DC mode.

FIG. 3A is a simplified schematic of the power circuit of FIGS. 1 and 3 where the primary windings and certain associated circuitry likes snubbers are not shown. Thus, a power circuit that operates in AC or DC mode, with a controller that can provide a CC or CV output has been described. The output is preferably used in sub arc welding.

Controller 103 allows the user to select between a CV mode and a CC mode of operation. Selection is preferably made using a toggle switch on the front panel of the power supply (or using a remote). Two regulators are provided: a current regulator and a voltage regulator. When CC operation is selected, the current regulator is used to control the output, and the voltage regulator is not used. When CV operation is selected, the output of the voltage regulator is used as the set point for the current regulator. The control is then based on the current regulator output. This cascading arrangement allows the user to select a CV output, and still use the current regulator to control the SCR firing.

Figure 4:
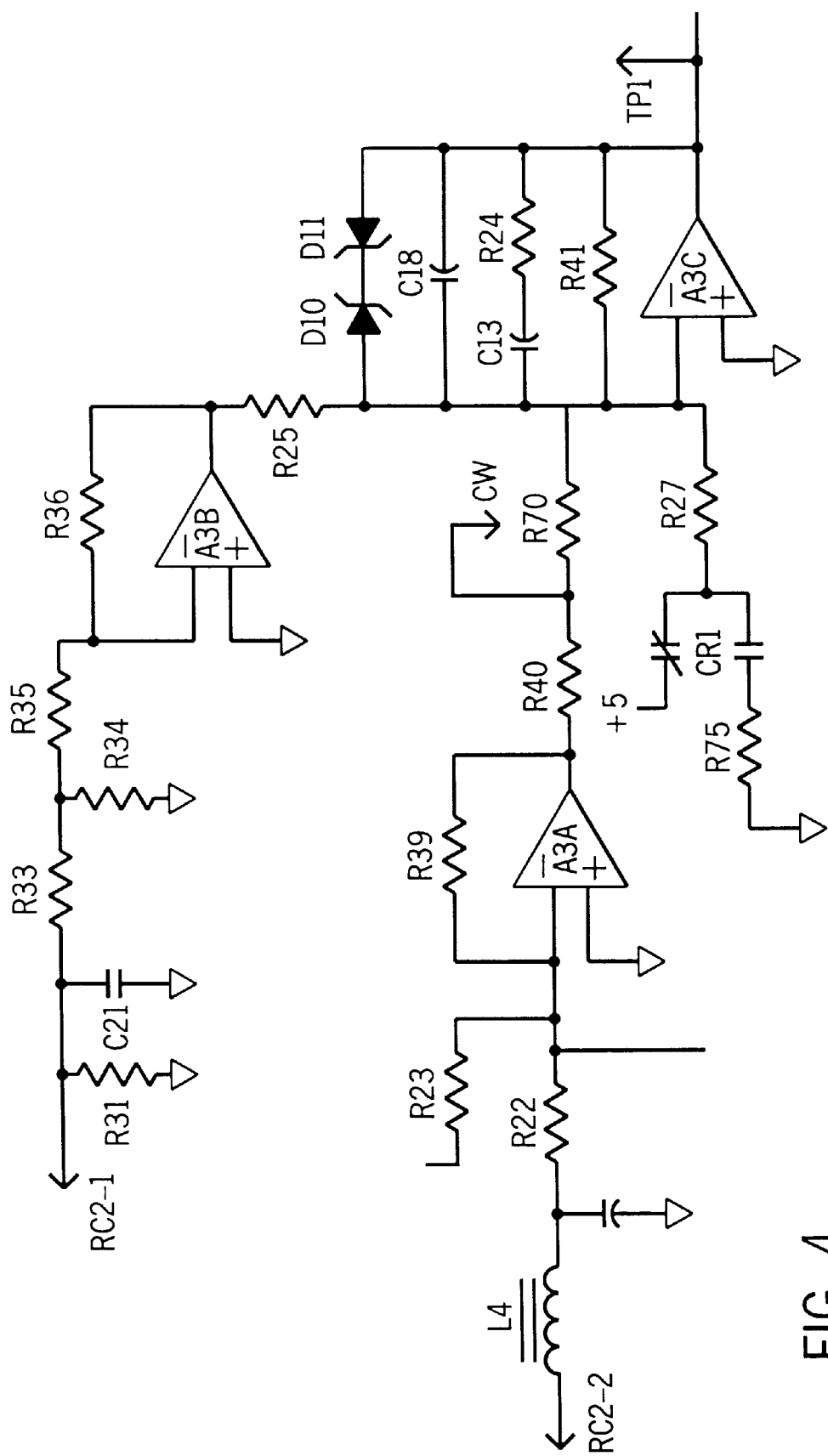
FIG. 4 is a circuit diagram of a current regulator used in the preferred embodiment.

The current regulator is a proportional integral (PI) current regulator, in the preferred embodiment, and is shown in FIG. 4. The current feedback signal is provided on RC2-1 from hall device HD1 (see FIG. 1). The current feedback signal is provided across a resistor R31 (5 ohms) and a capacitor C21 (0.1 μF) which filter the current feedback signal.

The filtered signal is provided to resistors R33 (475 ohms), R34 (511 ohms), R35 (10K ohms), R36 (200K ohms) and an op amp A3B. Op amp A3B scales the current feedback signal and provides it through a resistor R25 (39.2K ohms) to the integrating portion of the circuit.

The current reference signal (ISET) is provided on pin RC2-2. The current reference signal is, in the preferred embodiment, derived from a potentiometer on the front panel when the power supply is operated in the CC mode. The current reference input varies between 0 and 10 volts. The current reference input on pin RC2-2 is obtained from the output of the voltage regulator (described below) when the power supply is operated in the CV mode.

The current reference signal (ISET) is provided through an inductor L4 (1000 μhenry) and a capacitor C22 (0.1 μF) which filter and smooth the ISET. The filtered ISET is then provided to a resistor R22 (100K ohms), a resistor R39 (121K ohms) and an op amp A3A. Op amp A3 scales the ISET. A Resistor R23 (825K ohms) sets the minimum machine output. A relay CR1 shuts down the regulator when the machine is turned off.

The output of op amp A3A is provided through a resistor R40 (43.2K ohms) and a calibrating resistor R70 to the integrating portion of the PI regulator. The integrating portion of the regulator includes and op amp A3C, a resistor R41 (1M ohms), a capacitor C13 (0.33 μF), a resistor R24 (82.5K ohms), a capacitor C18 (560 pF), and zener diodes D10 and D11. The components are configured with op amp A3C such that the output of op amp A3C (an error signal) is a signal dependent upon the difference between the current reference and the current feedback signals, and the integral of that difference. The output is then used to trigger the SCR's.

When the error indicates that not enough current is being provided, the SCR's are triggered earlier in their cycles, thus providing more power. When the error signal indicates that too much power is being provided, the SCR's are fired later in their respective cycles.

Figure 5:
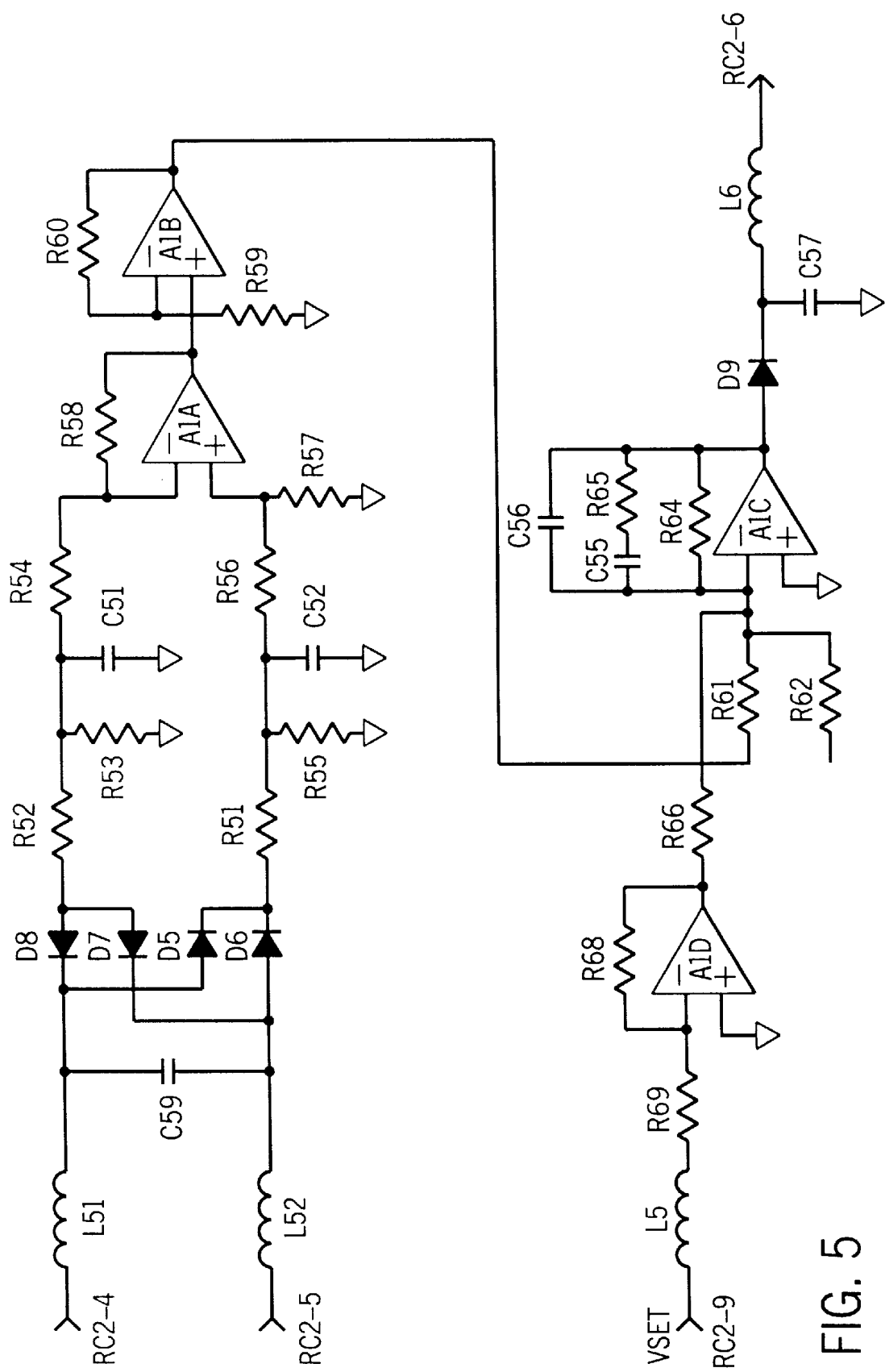
FIG. 5 is a circuit diagram of a voltage regulator used in the preferred embodiment.

The portion of controller 103 that provides the CV regulation in the preferred embodiment is shown in FIG. 5 and it is a PI regulator which receives as inputs on pins RC2-4 and RC2-5 the voltages on electrode E and work W (the output voltage). The output voltage feedback signals are provided through inductors L51 and L52 (1000 μhenry) and a capacitor C59 (0.01 μF) to smooth and filter the feedback signal. The smoothed and filtered feedback signal is rectified by a full bridge comprised of diodes D5–D8. The rectified feedback voltage signal is provided through a filter network comprised of resistors R52 (100K ohms), R53(5.62K ohms), R51(100K ohms), R55(5.62K ohms) and capacitors C51 (0.22 μF) and C52 (0.22 μF).

The signal is then provided to op amp A1A having scaling resistors R54 (100K ohms), R56 (100K ohms), R58 (221K ohms) and R57 (221K ohms). Op amp A1A scales the signal and provides it to another op amp AIB having feedback resistors R59 (47.5K ohms) and R60 (4.32K ohms). The output of amp A1B is a scaled feedback signal and is provided through a resistor R61 (10K ohms) to the inverting input of an op amp A1C.

A voltage reference command (VSET) is provided on pin RC2-9 and is preferably obtained from a potentiometer on the front panel of the power supply. Of course, other methods such as a remote or digital circuitry may be used to obtain the voltage reference signal. VSET is thus a signal indicative of the user's desired output voltage when operating in the CV mode.

VSET is provided through an inductor L5 (1000 μH), which smooths VSET to an op amp A1D, which has scaling resistors R69 (150K ohms) and R68 (100K ohms). The scaled VSET is provided through a resistor R66 (15K ohms) to op amp A1C.

Op amp A1C performs the proportional and integral functions. The circuitry associated with op amp A1C, including capacitor C56 (0.001F), capacitor C55 (0.22 μF) resistor R65 (35.7K ohms), and resistor R64 (332K ohms), are configured so as to provide the desired PI regulation. The output of op amp A1C is an error signal that is dependent on the difference, over time, between the voltage reference signal and the voltage feedback signal. Resistor R62 (61.9K ohms) sets minimum output voltage.

The error output of op amp A1C is provided through a diode D9, a capacitor C57 (0.1 $\mu$F) and an inductor L6 (1000 $\mu$henry). This error output is provided on pin RC2-6. When the power supply is operated in the CV mode pin RC2-6 is connected to pin RC2-2, so that ISET is the voltage regulator output.

Numerous modifications may be made to the present invention which still fall within the intended scope hereof. For example, other control circuitry could be employed, including digital circuitry. A regulator other than a PI regulator could be used. The regulators could be selected in the alternative, rather than in a cascading arrangement. Other power circuits could be used as well.

Thus, it should be apparent that there has been provided in accordance with the present invention a method and apparatus for providing sub arc welding power using a step-up cycloconverter having an AC/DC and CC/CV output that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An arc welding power supply comprising:
    a step-up cycloconverter having a primary side and a secondary side, and at least one control input on the secondary side;
    a feedback circuit that provides a signal indicative of the output voltage; and
    a controller coupled to the control input and the feedback circuit, wherein the controller controls the output of the cycloconverter in response to the output voltage to provide a constant voltage output.

2. The welding power supply of claim 1, further including a current feedback circuit that provides a signal indicative of the output current; and wherein the controller is further coupled to the current feedback circuit, and further wherein the controller controls the output of the cycloconverter in response to a user selectable one of output current and output voltage.

* * * * *